(12) United States Patent
Hirsch et al.

(10) Patent No.: US 12,203,672 B2
(45) Date of Patent: Jan. 21, 2025

(54) METHOD FOR PRODUCING AN EXCHANGER ELEMENT PACKAGE FOR A VEHICLE

(71) Applicants: Zehnder Group International AG, Graenichen (CH); Plastic Concept GmbH, Neusalza-Spremberg (DE)

(72) Inventors: Christian Hirsch, Eibenstock (DE); Ronny Göpfert, Oederan (DE); Mathias Witt, Schirgiswalde-Kirschau (DE); Martino Köhler, Kottmar OT Eibau (DE)

(73) Assignees: ZEHNDER GROUP TERNATIONAL AG, Gränchen (CH); PLASTIC CONCEPT GMBH, Neusalza-Spremberg (DE)

( * ) Notice: Subject to any disclaimer, the term of this patent is extended or adjusted under 35 U.S.C. 154(b) by 621 days.

(21) Appl. No.: 17/045,331

(22) PCT Filed: Apr. 5, 2019

(86) PCT No.: PCT/IB2019/052831
§ 371 (c)(1),
(2) Date: Nov. 2, 2020

(87) PCT Pub. No.: WO2019/193573
PCT Pub. Date: Oct. 10, 2019

(65) Prior Publication Data
US 2021/0148597 A1 May 20, 2021

(30) Foreign Application Priority Data
Apr. 5, 2018 (CH) .................................. 00442/18

(51) Int. Cl.
*F24F 12/00* (2006.01)
*B60H 1/00* (2006.01)
(Continued)

(52) U.S. Cl.
CPC ....... *F24F 12/006* (2013.01); *B60H 1/00207* (2013.01); *B60H 1/00514* (2013.01);
(Continued)

(58) Field of Classification Search
CPC ............ B60H 1/00207; B60H 1/00514; B60H 1/039; B60H 3/06; F24F 12/006;
(Continued)

(56) References Cited

U.S. PATENT DOCUMENTS 3,847,211 A * 11/1974 Fischel ................. F28D 9/0025
165/70
4,016,081 A * 4/1977 Martinez ................. B01D 61/28
210/321.75
(Continued)

FOREIGN PATENT DOCUMENTS

AU 2005337364 A1 4/2007
CN 2132254 Y 5/1993
(Continued)

OTHER PUBLICATIONS

International Search Report of Aug. 7, 2019 for PCT/IB2019/052831.
(Continued)

*Primary Examiner* — Ljiljana V. Ciric
(74) *Attorney, Agent, or Firm* — Pauley Erickson & Swanson

(57) ABSTRACT

A method for producing an exchanger element package for arrangement in an installation space on board a vehicle assigned to a passenger compartment and/or an engine bay, between inner walls of the installation space and an exchanger element to be installed in the installation space. The method includes providing an exchanger element; detecting inner dimensions of the installation space; detecting outer dimensions of the exchanger element; and provid- (Continued)

ing a mold with a mold cavity which is delimited by an outer mold wall and an inner mold wall, wherein the shape of the outer mold wall is defined by the inner dimensions or inner wall regions of the installation space and the shape of the inner mold wall is defined by the outer dimensions or outer wall regions of the exchanger element.

15 Claims, 2 Drawing Sheets

(51) Int. Cl.
  *B60H 1/03* (2006.01)
  *B60H 3/06* (2006.01)
  *F24F 1/0375* (2019.01)
  *F28D 21/00* (2006.01)
(52) U.S. Cl.
  CPC .......... *F28D 21/0015* (2013.01); *B60H 1/039* (2019.05); *B60H 3/06* (2013.01); *F24F 1/0375* (2019.02); *Y02B 30/56* (2013.01)
(58) Field of Classification Search
  CPC ................ F24F 1/0375; F28D 21/0015; F28D 21/0003; F28D 21/0014; Y02B 30/56; Y02T 50/40
  USPC .............................................. 165/4, 6, 7, 10
  See application file for complete search history.

(56) References Cited

U.S. PATENT DOCUMENTS

| | | | | | |
|---|---|---|---|---|---|
| 4,110,220 | A | * | 8/1978 | Lavender | B01D 63/082 |
| | | | | | 210/321.75 |
| 4,742,870 | A | * | 5/1988 | Darone | F28D 9/0037 |
| | | | | | 165/170 |
| 4,744,414 | A | * | 5/1988 | Schon | F28F 21/065 |
| | | | | | 165/905 |
| 7,055,575 | B2 | * | 6/2006 | Noel | A61F 7/02 |
| | | | | | 165/10 |
| 7,240,720 | B2 | * | 7/2007 | Noel | F28D 20/023 |
| | | | | | 62/530 |
| 8,915,468 | B2 | * | 12/2014 | Sabadie | B64C 1/406 |
| | | | | | 244/119 |
| 8,955,804 | B2 | * | 2/2015 | Brownjohn | B64C 1/068 |
| | | | | | 244/119 |
| 11,999,086 | B2 | * | 6/2024 | Wadsworth | B29C 45/14311 |
| 2005/0044712 | A1 | * | 3/2005 | Gideon | B64D 13/06 |
| | | | | | 29/527.3 |
| 2008/0047684 | A1 | * | 2/2008 | Noel | B29C 66/131 |
| | | | | | 165/104.11 |
| 2010/0132930 | A1 | * | 6/2010 | Izenson | F28F 3/12 |
| | | | | | 165/173 |
| 2015/0321397 | A1 | * | 11/2015 | Marchetti | B62D 25/14 |
| | | | | | 296/70 |
| 2020/0198755 | A1 | * | 6/2020 | Guering | B64C 1/061 |
| 2021/0268711 | A1 | * | 9/2021 | Lee | B32B 37/15 |

FOREIGN PATENT DOCUMENTS

| | | | | |
|---|---|---|---|---|
| CN | 2550203 | Y | | 5/2003 |
| CN | 101210787 | A | | 7/2008 |
| CN | 105753300 | A | | 7/2016 |
| DE | 3806783 | C2 | * | 4/1992 |
| DE | 10106045 | A1 | * | 8/2002 | ............... B32B 5/18 |
| DE | 60210729 | T2 | * | 4/2007 | ........... B29C 70/443 |
| DE | 102013021066 | A1 | * | 6/2015 | ............. B64C 1/066 |
| EP | 1510454 | A1 | * | 3/2005 | ............. B60R 13/02 |
| EP | 2071267 | A1 | | 6/2009 |
| EP | 3124375 | B1 | * | 5/2018 |
| EP | 2795225 | B1 | * | 3/2019 | ............. F24F 3/147 |
| FR | 1165665 | A | | 10/1958 |
| JP | 1973-48019659 | | | 6/1973 |
| JP | H08121986 | A | | 5/1996 |
| JP | 2006-335189 | A | | 12/2006 |
| RU | 2707597 | C2 | * | 11/2019 | ............. B29C 44/00 |
| WO | 036083 | A1 | | 4/2005 |
| WO | 042065 | A1 | | 4/2007 |
| WO | WO 2007/042065 | A1 | | 4/2007 |
| WO | WO-2009126051 | A1 | * | 10/2009 | ......... B29C 45/0001 |
| WO | WO-2020095188 | A1 | * | 5/2020 | ............. B29C 33/58 |
| WO | WO-2023055645 | A1 | * | 4/2023 | ....... B29C 45/14065 |

OTHER PUBLICATIONS

Korean Intellectual Property Office, Notice of Prohibition, Korean Patent Application No. 10-2020-7030409, mailed May 24, 2023 (4 pp.), and English Language Summary (4 pp.).

CPO, Chinese Patent Office, "Chinese Office Action for Chinese Patent Application No. 201980037435.4", issued on Nov. 27, 2023 (14 pages).

English language traslation of "Chinese Office Action (1st Inspection Notice)," for Chinese Application No. 201980037435.4, issued on 37 Nov. 2023 (18 pages).

P.R. China, National Intellectual Property Administration, "Chinese Office Action for Chinese Patent Application No. 201980037435.4", issued on Jun. 25, 2024 (19 pages).

English language translation of "Chinese Search Report," portion of the Chinese Office Action for Chinese Patent Appln. No. 201980037435.4, issued on Jun. 25, 2024 (3 pages).

* cited by examiner

METHOD FOR PRODUCING AN EXCHANGER ELEMENT PACKAGE FOR A VEHICLE

The invention relates to an exchanger element for use on board a vehicle, in particular for a passenger compartment and/or the engine bay of a vehicle, an aircraft, a ship, a cable car, or an elevator, in particular with an electric drive or with a hybrid drive or with a sail drive, as well as a vehicle equipped with such an exchanger element. The invention also relates to a method for producing an exchanger element package for arrangement in an installation space on board a vehicle, in particular in an installation space assigned to a passenger compartment and/or an engine bay, between the inner walls of the installation space and an exchanger element to be installed in the installation space.

The use of a heat exchanger for heating passenger compartments is known. Typically, the waste heat from an internal combustion engine is used to preheat the feed air introduced into the passenger compartment by means of a heat exchanger. With this use, one is dependent on the thermal energy that arises during the combustion of the fuel in the internal combustion engine.

It is also known to use an air conditioning system for conditioning the air in vehicle compartments. Typical applications are the drying and/or cooling of the feed air introduced into the passenger compartment. With this use, too, one is dependent on the energy that arises from the combustion of the fuel in the internal combustion engine for the operation of the air conditioning system (compressor).

The object of the invention is to make it possible to heat or air-condition a vehicle region, in particular a passenger compartment and/or an engine bay, with the least possible or no additional expenditure of energy.

To achieve this object, the invention provides an exchanger element for use on board a vehicle, in particular for a passenger compartment and/or the engine bay of a vehicle, an aircraft, a ship, a cable car, or an elevator, in particular with an electric drive or with a hybrid drive or with a sail drive, wherein the exchanger element has an exhaust air flow path and a feed air flow path, and wherein the exhaust air flow path and the feed air flow path are separated from one another by partition sections that have heat-transmitting wall regions, wherein the exhaust air flow path has a fluid connection from the interior of the vehicle, in particular from the passenger compartment or from the engine bay, to the outer surroundings of the vehicle, and wherein the feed air flow path forms a fluid connection from the outer surroundings of the vehicle to a location on board the vehicle, in particular to the interior of the passenger compartment and/or the engine bay, characterized in that the exchanger element is embedded in a package, the outer surface area shape of which matches the inner dimensions of an installation space on board the vehicle, in particular in the passenger compartment and/or in the engine bay, for the installation of the exchanger element.

The exchanger element according to the invention makes it possible to transfer part of the thermal energy of the exhaust air exiting the vehicle to the feed air entering the vehicle. This enables the passenger compartment to be kept warm for a longer period of time in winter if the internal combustion engine is not available (pure electric drive) or the internal combustion engine is not always switched on (hybrid drive). Embedding the exchanger element in a package that is specially adapted to the available installation space enables the exchanger element to be solidly integrated into the installation space on board a vehicle. In terms of installation, the package thus serves as an interface between the installation space and the exchanger element. In particular, the package is a lining of at least a partial region of the passenger compartment or the engine bay with cutouts for the exchanger element. The package or a part thereof is preferably used to define air flows outside the exchanger element, which flow towards the exchanger element or away from the exchanger element. In addition to such air routing or air separation outside the exchanger element, the package also provides thermal and sound insulation.

The terms "package" and "exchanger element package" are used in the following. They have the same meaning in connection with the present invention.

In an advantageous embodiment, the package contains an expanded and/or foamed polymer material and/or a fiber material, in particular made of organic or inorganic fibers. It is particularly advantageous if the package is made entirely from an expanded and/or foamed polymer material. This makes it possible to achieve good thermal insulation and sound insulation for the exchanger element with a low mass.

To achieve an advantageous porosity of the package for the heat insulation, the sound insulation, and the mechanical damping, in particular the shock absorption of the exchanger element, a material with closed pores, in particular a foamed polymer material, and/or a material with open pores, in particular an organic or inorganic fiber material can be used.

An expanded homopolymerizate such as expanded polypropylene (EPP), expanded polystyrene (EPS), expanded polyethylene (EPE) or expanded polylactide (EPLA) can be used as the expanded polymer material.

According to a first alternative, the expanded polymer material used can be an expanded copolymer that has at least one of the components propylene, styrene, ethylene, or lactic acid as a component.

According to a second alternative, a mixture of expanded homopolymer that has at least one of the components polypropylene (PP), polystyrene (PS), polyethylene (PE), or polylactide (PLA) as a component can be used as the expanded polymer material.

According to a third alternative, the expanded polymer material used can be a mixture of expanded copolymers that has at least one of the components propylene, styrene, ethylene, or lactic acid as a component.

According to a fourth alternative, a mixture of expanded homopolymerizate and co-polymerizate that has at least one of the components propylene, styrene, ethylene, or lactic acid as a component can be used as the expanded polymer material.

The expanded polymer material can have a density of 20 to 120 $kg/m^3$, preferably 30 to 60 $kg/m^3$, and particularly preferably 40 to 60 $kg/m^3$.

The particle diameters of the particles of the expanded polymer fused together are preferably 2 to 6 mm. Particle diameters of 3 to 5 mm are particularly preferred.

Alternatively, polyurethane can also be used as the material for the package, wherein the inner part of the package preferably comprises polyurethane foam and the outer part of the package comprises solid or less foamed polyurethane.

In a further advantageous embodiment, the package contains several package parts. A package that contains two package parts is particularly preferred. This enables the exchanger element with its package to be installed in the installation space of the vehicle in just a few simple steps.

In addition to the expanded polymer material acting as an insulating body, the package expediently contains a further polymer material, which envelops the expanded polymer material of the package inside and/or outside, wherein the further polymer material is preferably a less expanded or a compact, non-expanded polymer material. As an enclosure, it helps protect the insulating body from mechanical or chemical damage.

A thermoplastic can be used as the material of the enclosure, such as acrylonitrile butadiene styrene (ABS), polycarbonate (PC), polypropylene (PP), polyamide 6 (PA6), polyamide 66 (PA66), polyoxymethylene (POM), acrylonitrile styrene acrylate (ASA), polystyrene (PS), polyethylene terephthalate (PET), polybutylene terephthalate (PBT), etc.

The thermoplastics used can be provided with fillers, such as glass beads, talc, minerals, etc., and/or can be reinforced with fibers, such as glass fibers, carbon fibers, hemp fibers, bamboo fibers, etc.

In a further advantageous embodiment, the thermoplastic material is physically and/or chemically foamed during the manufacture of the enclosure. As a result, the enclosure simultaneously takes on the function of the insulating body, which means that it can then be omitted as a separate component.

The package in which the exchanger element is embedded is expediently hermetically sealed, with the exception of its openings for the feed air flow path and the exhaust air flow path. To achieve a hermetic seal between the exchanger element and the package, seals made of an elastomer material such as silicone or polyurethane can be used.

The package parts expediently contain fastening formations with which adjoining package parts can be fastened to one another. In a first step, the package parts can thus be arranged around the exchanger element and fastened to one another. The thus assembled unit of the exchanger element and the package can then be inserted into the available space in a second step. The fastening formations are preferably fastened to the further, less expanded or compact polymer material of the enclosure.

A first ventilator is preferably assigned to the exchanger element, which is arranged upstream or downstream of the exchanger element in the feed air flow path and is embedded in the package.

A second ventilator is preferably assigned to the exchanger element, which is arranged upstream or downstream of the exchanger element in the exhaust air flow path and is embedded in the package.

A first air filter is preferably assigned to the exchanger element, which is arranged upstream of the exchanger element in the feed air flow path and is embedded in the package.

A second air filter is preferably assigned to the exchanger element, which is arranged upstream of the exchanger element in the exhaust air flow path and is embedded in the package.

By embedding such functional elements, such as ventilator(s) and/or air filter(s), the installation of the complete assembly, which has the exchanger element as well as ventilators and air filter(s), is made even easier.

The exchanger element expediently contains an electrical heating element that can be supplied by an accumulator assigned to the electric drive or the hybrid drive. This electrical heating element can be activated if necessary to heat the exchanger element if the exchanger element should freeze.

The exchanger element preferably contains at least one temperature sensor for detecting an air temperature in the exchanger element.

The exchanger element preferably contains at least one moisture sensor for detecting an air humidity in the exchanger element.

The exchanger element preferably contains at least one pressure sensor for detecting an air pressure in the exchanger element.

An air quality sensor is preferably contained in the exchanger element. In a particularly preferred embodiment, the exchanger element contains a sensor for volatile organic compounds (VOC sensor) and/or a carbon dioxide sensor and/or a carbon monoxide sensor.

The package preferably contains a control unit or regulator unit which is connected to at least one of the functional elements mentioned above, i.e., the ventilator or electrical heating element, as well as to at least one of the sensors mentioned above, i.e., the temperature sensor, humidity sensor, or pressure sensor. Together with the sensors, the control unit or regulator unit enables regulated operation of the exchanger element.

In a further advantageous embodiment, the partition sections contain wall regions that are selectively permeable to water vapor. Such wall regions preferably contain polymer membranes which are selectively permeable to water vapor, and which are applied to air-permeable carrier materials. The selectively permeable polymer membranes allow the relatively small and polar water molecules to pass through the membrane material, while they do not allow large and/or less polar or not at all polar molecules, such as molecules of oxygen, nitrogen, carbon dioxide, or noble gases, or relatively large molecules with pleasant or unpleasant smelling substances, to pass through the membrane material. The exchanger element according to the invention thus makes it possible, on the one hand, to transfer part of the humidity of the exhaust air exiting the passenger compartment to the feed air entering the passenger compartment. In addition to maintaining a pleasant room temperature, this also enables the maintenance of a pleasant, sufficiently high level of humidity in the passenger compartment in winter. The exchanger element according to the invention thus makes it possible, on the other hand, to transfer part of the air humidity of the feed air entering the passenger compartment to the exhaust air exiting the passenger compartment. In addition to maintaining a pleasant room temperature, this also makes it possible to maintain a pleasant, sufficiently low level of humidity in the passenger compartment in summer.

The package preferably contains regions with a first hardness and regions with a second hardness.

Preferably, the package has regions bearing against the exchanger element having a greater hardness and regions bearing against the installation space having a lower hardness, or the package has regions bearing against the exchanger element having a lower hardness and regions bearing against the installation space having a greater hardness.

These measures contribute to shock absorption. In particular, the expanded polymer materials described above are elastic, but absorb a large part of the deformation energy introduced into the material during mechanical deformation, so that a good damping is achieved.

The invention also provides a vehicle, in particular an aircraft, ship, cable car, or elevator, in particular with an electric drive or with a hybrid drive or with a sail drive, wherein the vehicle, in particular the passenger compartment and/or the engine bay, is assigned to an exchanger element and a package of the above-described type.

A ventilator can be connected in the exhaust air flow path and/or in the feed air flow path to transport exhaust air along the exhaust air flow path and/or feed air along the feed air flow path.

The exhaust air flow path is preferably in fluid connection with the outer surroundings of the passenger compartment in a low-pressure outer region. This means that the exhaust air can be extracted from the passenger compartment even without a ventilator.

The feed air flow path is preferably in fluid connection with a the outer surroundings of the passenger compartment in a high-pressure outer region. This means that the feed air can be forced into the passenger compartment even without a ventilator.

At least one temperature sensor for detecting an air temperature in the passenger compartment is preferably contained in the passenger compartment.

The passenger compartment preferably contains at least one moisture sensor for detecting an air humidity in the passenger compartment.

At least one pressure sensor for detecting an air pressure in the passenger compartment is preferably contained in the passenger compartment.

Together with the sensors in the passenger compartment and/or the sensors in the exchanger element, the control unit or regulator unit enables a regulated operation of the exchanger element to achieve pleasant climatic conditions in the passenger compartment.

If the vehicle is an automobile, a package with an exchanger element embedded therein can be arranged in at least one of the following locations of the automobile: on the ceiling of the passenger compartment; on the roof of the automobile; at the front of the automobile; in the A-pillar of the automobile; in the B-pillar of the automobile; in the C-pillar of the automobile; in the rear of the automobile; under the hood of the automobile; in the floor of the automobile.

When the package is arranged on the ceiling or in the roof liner of the passenger compartment, the feed air flow path preferably runs from an entry region on the front of the automobile through the engine bay, through at least one of the A-pillars, through the exchanger element and finally through at least one of the B-pillars in the footwell of the passenger compartment. The exhaust air flow path can run from the passenger compartment space through the rear region, through at least one of the C-pillars and through the exchanger element with an exit region on the vehicle roof. Alternatively, the exhaust air flow path from the passenger compartment space can run through at least one of the C-pillars and through the exchanger element with an exit region on the vehicle roof.

When the package is arranged on the front side of the automobile, the feed air flow path preferably runs from an entry region on the front of the automobile through the exchanger element and through the engine bay into the passenger compartment space. The exhaust air flow path can run from the passenger compartment space through the engine bay and through the exchanger element with an exit region on at least one side of the vehicle.

When the package is arranged in the B-pillar of the automobile, the feed air flow path preferably runs from an entry region on the front of the automobile through the engine bay, through at least one of the A-pillars, through part of the vehicle roof and finally through the exchanger element into the footwell of the passenger compartment. The exhaust air flow path can run from the passenger compartment space through at least one of the B-pillars, through the exchanger element and through a rear part of the vehicle roof with an exit region on the rear of the vehicle.

When the package is arranged under the hood of an automobile, the feed air flow path preferably runs from an entry region on the front of the automobile through the exchanger element, through part of the engine bay and finally into the front region of the passenger compartment space. The exhaust air flow path can run from the passenger compartment space through the rear region, along the floor of the vehicle into the front region of the passenger compartment space and through the exchanger element with an exit region on at least one side of the vehicle.

The invention also provides a method for producing an exchanger element package for arrangement in an installation space on board a vehicle, in particular in an installation space assigned to a passenger compartment and/or an engine bay, between the inner walls of the installation space and an exchanger element to be installed in the installation space, wherein the method comprises the following steps:
 a) providing an exchanger element;
 b) detecting the inner dimensions of the installation space;
 c) detecting the outer dimensions of the exchanger element;
 d) providing a mold with a mold cavity which is delimited by an outer mold wall and an inner mold wall, wherein the shape of the outer mold wall is defined by the inner dimensions or inner wall regions of the installation space and the shape of the inner mold wall is defined by the outer dimensions or outer wall regions of the exchanger element;
 e) partial filling of the mold cavity with a flowable or free-flowing material;
 f) expanding or foaming the flowable or free-flowing material, wherein the mold cavity is filled with the expanded or foamed material; and
 g) opening the mold and removing the expanded or foamed material from the mold cavity as an exchanger element package after the expanded or foamed material has solidified.

Steps a), b) and c) are carried out once for each type of passenger compartment. Steps d), e), f) and g) are then repeated to produce a plurality of exchanger element packages suitable for a given passenger compartment.

The invention also provides an alternative method for producing an exchanger element package in an installation space on board a vehicle, in particular in an installation space assigned to a passenger compartment and/or an engine bay, between the inner walls of the installation space and an exchanger element to be installed in the installation space, wherein the method comprises the following steps:
 a) providing an exchanger element;
 b) arranging the exchanger element in the installation space, whereby a mold cavity is defined between the inner dimensions or inner wall regions of the installation space and outer dimensions or outer wall regions of the exchanger element;
 c) foaming the mold cavity with a foamable polymer material; and
 d) waiting for the foamed polymeric material to solidify.

The invention also provides a further alternative method for producing an exchanger element package for arrangement in an installation space on board a vehicle, in particular in an installation space assigned to a passenger compartment and/or an engine bay, between the inner walls of the installation space and an exchanger element to be installed in the installation space, wherein the method comprises the following steps:

a) providing an exchanger element;
b) detecting the inner dimensions of the installation space;
c) detecting the outer dimensions of the exchanger element;
d) providing a mold with a mold cavity which is delimited by an outer mold wall and an inner mold wall, wherein the shape of the outer mold wall is defined by the inner dimensions or inner wall regions of the installation space and the shape of the inner mold wall is defined by the outer dimensions or outer wall regions of the exchanger element;
e) filling the mold cavity with a molten material by injecting the molten material into the mold cavity; and
f) opening the mold and removing the injected material from the mold cavity as an exchanger element package after the injected material has solidified.

Steps a), b) and c) are carried out once for each type of passenger compartment. Steps d), e) and f) are then repeated to produce a plurality of exchanger element packages suitable for a given passenger compartment.

Such an injection molding process can be carried out as a compact injection molding process, as a foam injection molding process with physical and/or chemical foaming, as an internal gas pressure injection molding process or as a gas counter-pressure injection molding process to produce the exchanger element package.

The invention also provides yet another alternative method for producing an exchanger element package for arrangement in an installation space on board a vehicle, in particular in an installation space assigned to a passenger compartment and/or an engine bay, between the inner walls of the installation space and an exchanger element to be installed in the installation space, wherein the method comprises the following steps:
a) providing an exchanger element;
b) arranging the exchanger element in the construction space, whereby a mold cavity is defined between the inner dimensions or inner wall regions of the construction space and outer dimensions or outer wall regions of the exchanger element;
c) providing powdery or coarse-grained, fusible building material;
d) applying a building material layer comprising the powdery or coarse-grained building material to a target surface in an installation region by means of an application means;
e) targeted application of energy to selected points of the building material layer, which correspond to a cross-section of the exchanger element package to be formed or the mold cavity within the building material layer, to fuse the powdery or coarse-grained building material at the selected points inside the building material layer with a previously applied and fused building material layer, and
f) if necessary, removing non-fused powdery or coarse-grained building material; wherein steps c), d), e) and f) are carried out repeatedly to build up the exchanger element package to be formed in layers.

Steps a) and b) are carried out once for each type of passenger compartment. Steps c), d), e) and f) are then repeated to produce a plurality of exchanger element packages suitable for a given passenger compartment.

Depending on the fineness of the building material particles of the powdery to coarse-grained building material, various energy sources can be used.

For building material in powder form (mean particle diameter less than 1 mm), strongly focused laser beams, i.e., fine selective laser sintering, are preferably used.

For coarse-grained building material (mean particle diameter greater than 1 mm), less strongly focused laser beams, i.e., coarse selective laser sintering, are preferably used. In this coarse selective laser sintering, coarse-grained building material can be used, which softens and/or melts and thereby expands or foams through the action of energy, in particular laser radiation and/or heat through physically- and/or chemically-triggered gas production in the building material grains, wherein is achieved a gluing or fusing of expanded or foamed particles within an applied layer and with a previously applied layer.

The particle diameters of the particles of the expanded polymer that are glued or fused together are preferably 2 to 6 mm. Particle diameters of 3 to 5 mm are particularly preferred. This has the advantage that, if the surface is sufficiently smooth, short construction times can be achieved for an exchanger element package manufactured using this additive method.

The invention also provides a still further alternative method for producing an exchanger element package for arrangement in an installation space of a vehicle, in particular in an installation space assigned to a passenger compartment and/or an engine bay, between the inner walls of the installation space and an exchanger element to be installed in the installation space, wherein the method comprises the following steps:
a) providing an exchanger element;
b) arranging the exchanger element in the construction space, whereby a mold cavity is defined between the inner dimensions or inner wall regions of the construction space and outer dimensions or outer wall regions of the exchanger element;
c) providing liquid or pasty, curable building material;
d) targeted application of the liquid or pasty, curable building material at selected points as a building material layer on a target surface in a building region by means of an application means, wherein the building material layer corresponds to a cross-section of the exchanger element package or the mold cavity to be formed;
e) allowing the building material layer to cure to solidify the liquid or pasty building material within the building material layer and to connect it to a previously applied and cured building material layer;
wherein steps d) and e) are carried out repeatedly to build up the exchanger element package to be formed in layers.

Steps a) and b) are carried out once for each type of passenger compartment. Steps c), d) and e) are then repeated to produce a plurality of exchanger element packages suitable for a given passenger compartment.

Various energy sources can be used depending on the fineness or portion size of the liquid or pasty building material applied in punctiform and/or linear fashion.

A coarse application of the building material (mean droplet diameter or strand diameter greater than 1 mm), i.e., a coarse selective application or a coarse 3D printing, is preferably used. With this coarse, selective application or coarse 3D printing, a building material mass can be used which, when exiting a building material storage container via a nozzle and/or through the action of energy, in particular radiation and/or heat through physically- and/or chemically-triggered gas production in the building material mass expands or foams, wherein a gluing or fusing of expanded or foamed particles is achieved within an applied layer and with a previously applied layer.

Here too, the diameter of the drops or strands of the expanded or foamed polymer glued or fused to one another is preferably 2 to 6 mm. Diameters of 3 to 5 mm are particularly preferred. This has the advantage that, if the surface is sufficiently smooth, short construction times can also be achieved for an exchanger element package manufactured using this additive method.

As mentioned above, the exchanger element according to the invention or the passenger compartment according to the invention are not limited to "winter operation" (low outside temperature and low outside humidity), in which the aim is to keep as much heat and possibly water vapor as possible from people in the passenger compartment. Rather, the exchanger element according to the invention or the passenger compartment according to the invention is also suitable for "summer operation" (high outside temperature and high outside humidity), in which the aim is to keep as much heat and possibly water vapor away from people in the passenger compartment, i.e., to pre-cool the relatively warm and relatively humid feed air through the relatively cool and relatively dry exhaust air and, if necessary, to pre-dry it.

Further features, advantages and possible applications of the invention emerge from the following description of non-restrictive exemplary embodiments of the invention with reference to the drawing.

In the following:

Figure 4:
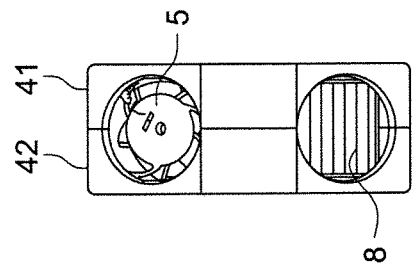
FIG. 4 shows a second side view of the exchanger element with the package.
Figure 3:
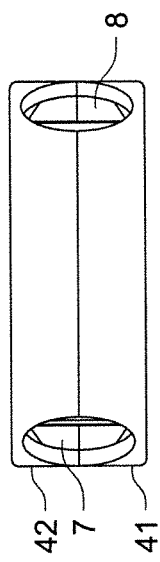
FIG. 3 shows a first side view of the exchanger element with the package.
Figure 2:
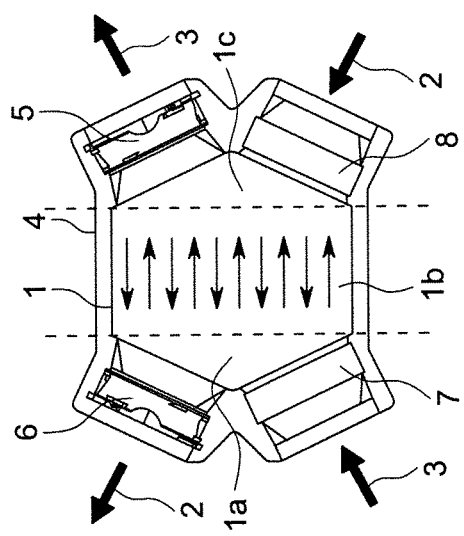
FIG. 2 shows a sectional view of the exchanger element with the package.
Figure 1:
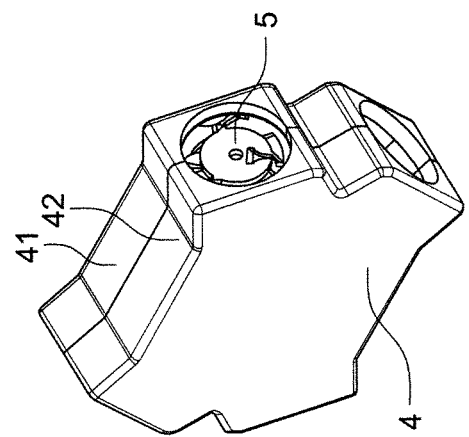
FIG. 1 shows a perspective view of the exchanger element with the package.

FIGS. 1, 2, 3, and 4 show an exchanger element 1 for a passenger compartment of a vehicle. The exchanger element 1 has an exhaust air flow path 2 and a feed air flow path 3. The exhaust air flow path 2 and the feed air flow path 3 are separated from one another by partition sections (not shown). These partition sections contain heat-transmitting wall regions. The exhaust air flow path 2 forms a fluid connection from the interior of the passenger compartment to the outer surroundings of the passenger compartment, while the feed air flow path 3 forms a fluid connection from the outer surroundings of the passenger compartment to the interior of the passenger compartment. Inside the exchanger element 1 there is a first cross-flow region 1a, a counter-flow region 1b and a second cross-flow region 1c. In the two cross-flow regions 1a and 1c, the exhaust air flow path 2 and the feed air flow path 3 cross one another. In the counter-flow region 1b, the exhaust air flow path 2 and the feed air flow path 3 run parallel to one another.

The exchanger element 1 is embedded in a package 4, the outer surface area shape of which matches the inner dimensions of an installation space in the passenger compartment for the installation of the exchanger element 1. The package 4 is made of an expanded polymer material and consists of a first package part 41 and a second package part 42, which, depending on the situation, can be symmetrical to one another or even identical or can have a very special "unshapely" design that is adapted to the circumstances of the space available in the passenger compartment.

A first ventilator 5 is assigned to the exchanger element 1 and is arranged downstream of the exchanger element 1 in the feed air flow path 3 and is embedded in the package 4. In addition, the exchanger element 1 is assigned a second ventilator 6, which is arranged downstream of the exchanger element 1 in the exhaust air flow path 2 and is embedded in the package 4.

The exchanger element 1 is assigned a first air filter 7, which is arranged upstream of the exchanger element in the feed air flow path 3 and is embedded in the package 4. In addition, the exchanger element 1 is assigned a second air filter 8, which is arranged upstream of the exchanger element in the exhaust air flow path 2 and is embedded in the package 4.

Each of FIGS. 5, 6, 7 and 8 show an arrangement of the exchanger element 1 and the package 4. A first ventilator 5 is assigned to the exchanger element 1 and is arranged downstream of the exchanger element 1 in the feed air flow path 3 and is embedded in the package 4. The exchanger element 1 is assigned to a second ventilator 6, which is arranged upstream or downstream of the exchanger element 1 in the exhaust air flow path 2 and is embedded in the package 4. The exchanger element 1 is assigned to a first air filter 7 which is arranged upstream of the exchanger element 1 in the feed air flow path 3 and is embedded in the package 4. The exchanger element 1 is assigned to a second air filter 8, which is arranged upstream of the exchanger element 1 in the exhaust air flow path 2 and is embedded in the package 4. In these arrangements, the two ventilators 5 and 6 each work in suction mode.

Figure 5:
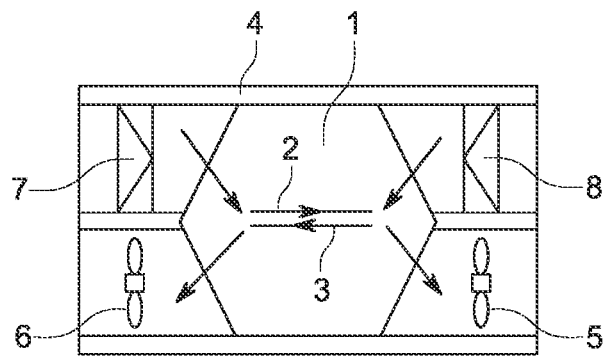
FIG. 5 shows a schematic view of a first exchanger element/package arrangement.

FIG. 5 shows a schematic view of a first arrangement of the exchanger element 1 and the package 4. The exchanger element 1 is a symmetrical counter-flow heat exchanger with a first cross-flow region on the left and a second cross-flow region on the right, in which the exhaust air flow path 2 and the feed air flow path 3 intersect. A counter-flow region is arranged therebetween, in which the exhaust air flow path 2 and the feed air flow path 3 are parallel and in opposite directions.

Figure 6:
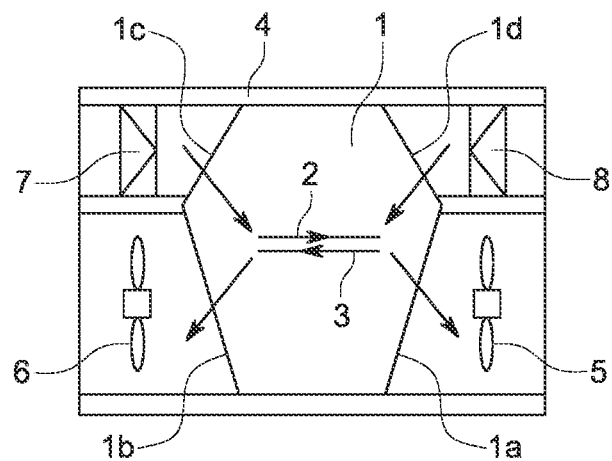
FIG. 6 shows a schematic view of a second exchanger element/package arrangement.

FIG. 6 shows a schematic view of a second arrangement of the exchanger element 1 and the package 4. The exchanger element 1 is an asymmetrical counter-flow heat exchanger with a first cross-flow region on the left and a second cross-flow region on the right, in which the exhaust air flow path 2 and the feed air flow path 3 intersect. A counter-flow region is arranged therebetween, in which the exhaust air flow path 2 and the feed air flow path 3 are parallel and in opposite directions. A first large ventilator 5 is assigned to a first large outflow region 1a of the exchanger element 1. A second large ventilator 6 is assigned to a second large outflow region 1b of the exchanger element 1. A first small air filter 7 is assigned to a first small inflow region 1c of the exchanger element 1. A second small air filter 8 is assigned to a second small inflow region 1d of the exchanger element 1.

Figure 7:
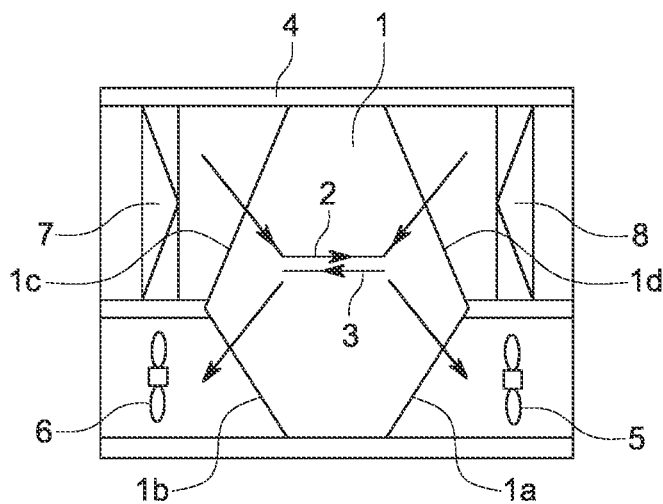
FIG. 7 shows a schematic view of a third exchanger element/package arrangement.

FIG. 7 shows a schematic view of a third arrangement of the exchanger element 1 and the package 4. The exchanger element 1 is also an asymmetrical counter-flow heat exchanger with a first cross-flow region on the left and a second cross-flow region on the right, in which the exhaust air flow path 2 and the feed air flow path 3 intersect. A counter-flow region is arranged therebetween, in which the exhaust air flow path 2 and the feed air flow path 3 are parallel and in opposite directions. A first small ventilator 5 is assigned to a first small outflow region 1*a* of the exchanger element 1. A second small ventilator 6 is assigned to a second small outflow region 1*b* of the exchanger element 1. A first large air filter 7 is assigned to a first large inflow region 1*c* of the exchanger element 1. A second large air filter 8 is assigned to a second large inflow region 1*d* of the exchanger element 1.

Figure 8:
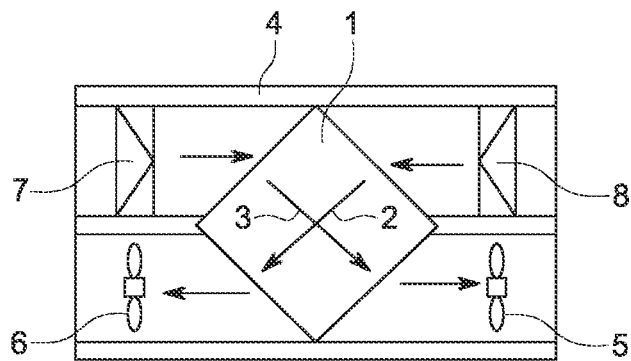
FIG. 8 shows a schematic view of a fourth exchanger element/package arrangement.

FIG. 8 shows a schematic view of a fourth arrangement of the exchanger element 1 and the package 4. Here, the exchanger element 1 is a cross-flow heat exchanger with only one cross-flow region in which the exhaust air flow path 2 and the feed air flow path 3 intersect.

The invention claimed is:

1. A method for producing an exchanger element package (4) for arrangement in an installation space on board a vehicle and assigned to a passenger compartment and/or an engine bay, between inner walls of the installation space and an exchanger element (1) to be installed in the installation space, wherein the method comprises the following steps:
   a) providing an exchanger element;
   b) detecting inner dimensions of the installation space;
   c) detecting outer dimensions of the exchanger element;
   d) providing a mold with a mold cavity which is delimited by an outer mold wall and an inner mold wall, wherein the shape of the outer mold wall is defined by the inner dimensions or inner wall regions of the installation space and the shape of the inner mold wall is defined by the outer dimensions or outer wall regions of the exchanger element;
   e) either i) partial filling of the mold cavity with a flowable or free-flowing material and expanding or foaming the flowable or free-flowing material, wherein the mold cavity is filled with the expanded or foamed material and opening the mold and removing the expanded or foamed material from the mold cavity as an exchanger element package (4) after the expanded or foamed material has solidified, or ii) filling the mold cavity with a molten material by injecting the molten material into the mold; and opening the mold and removing the injected material from the mold cavity as an exchanger element package (4) after the injected material has solidified; and
   f) installing the exchanger element package into the installation space.

2. The method of claim 1 wherein the flowable or free-flowing material comprises an expandable or foamed polymer.

3. The method of claim 2 wherein the expandable or foamed polymer comprises at least one of propylene, styrene, ethylene, and lactic acid.

4. The method of claim 2 wherein the expandable or foamed polymer comprises at least one of polypropylene, polystyrene, polyethylene, and polylactide.

5. The method of claim 2 wherein the expandable or foamed polymer comprises a mixture of expanded copolymers comprising at least one of propylene, styrene, ethylene, and lactic acid.

6. The method of claim 2 wherein the expandable or foamed polymer comprises particles having diameters of 2 mm to 6 mm in length.

7. The method of claim 6 wherein the expandable or foamed polymer comprises particles having diameters of 3 mm to 5 mm in length.

8. The method of claim 1 wherein the exchanger element package (4) comprises regions with a first hardness and regions with a second hardness.

9. The method of claim 8 wherein the regions with the first hardness bear against the exchanger element and the regions with the second hardness bear against the installation space.

10. The method of claim 9 wherein the first hardness is greater than the second hardness.

11. The method of claim 9 wherein the second hardness is greater than the first hardness.

12. The method of claim 1 further comprising applying a laser to the flowable or free-flowing material.

13. The method of claim 1 further comprising laser sintering the flowable or free-flowing material.

14. The method of claim 1 wherein the mold comprises the passenger compartment of the vehicle.

15. The method of claim 1 wherein the exchanger element is provided in the passenger compartment of a vehicle.

* * * * *